US012297816B2

(12) United States Patent
Nies et al.

(10) Patent No.: US 12,297,816 B2
(45) Date of Patent: May 13, 2025

(54) DRIVE TRAIN ASSEMBLIES FOR WIND TURBINES

(71) Applicant: General Electric Renovables Espana, S.L., Barcelona (ES)

(72) Inventors: Jaco Nies, Hertme (NL); Laia Esteban Soler, Barcelona (ES); Francesco Maccarana, Nantes (FR); Thomas Drots, Nantes (FR); Josep Bosch-Collado, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/483,059

(22) Filed: Oct. 9, 2023

(65) Prior Publication Data

US 2024/0125301 A1 Apr. 18, 2024

(30) Foreign Application Priority Data

Oct. 17, 2022 (EP) ..................................... 22382995

(51) Int. Cl.
*F03D 9/25* (2016.01)
*F03D 1/06* (2006.01)
(Continued)

(52) U.S. Cl.
CPC ............... *F03D 9/25* (2016.05); *F03D 1/065* (2013.01); *H02K 7/08* (2013.01); *H02K 7/183* (2013.01)

(58) Field of Classification Search
CPC ..................................... F03D 9/25; H02K 7/08
See application file for complete search history.

(56) References Cited

U.S. PATENT DOCUMENTS

2011/0254279 A1* 10/2011 Ventzke .................. F03D 13/20
290/55
2012/0121419 A1* 5/2012 Castell .................. F03D 1/0691
416/170 R
(Continued)

FOREIGN PATENT DOCUMENTS

CN 103982373 A 8/2014
EP 3351791 A1 7/2018
(Continued)

OTHER PUBLICATIONS

European Search Report Corresponding to EP22382995 on Apr. 3, 2023.
(Continued)

*Primary Examiner* — Sean Gugger
(74) *Attorney, Agent, or Firm* — Dority & Manning, P.A.

(57) ABSTRACT

The present disclosure relates to drive train assemblies for a wind turbine. These assemblies may comprise a rotor hub and a generator module. The generator module comprises a generator stator, and a stationary frame for supporting the generator stator. The generator further comprises a generator rotor, a shaft for supporting the generator rotor, and a bearing assembly for rotatably mounting the shaft on the stationary frame. The shaft is removably connected to the generator rotor, and the bearing assembly comprises a front bearing and a rear bearing. An upwind end of the generator module is attached to a downwind end of the rotor hub. The present disclosure further relates to wind turbines including such wind turbine assemblies and to methods for assembling drive train assemblies.

27 Claims, 4 Drawing Sheets

(51) Int. Cl.
*H02K 7/08* (2006.01)
*H02K 7/18* (2006.01)

(56) References Cited

U.S. PATENT DOCUMENTS

| | | | |
|---|---|---|---|
| 2013/0292950 A1* | 11/2013 | Ritschel | H02K 7/1838 |
| | | | 290/55 |
| 2015/0322922 A1* | 11/2015 | Himmelmann | F03D 80/82 |
| | | | 290/55 |
| 2021/0033073 A1* | 2/2021 | Hemmelmann | F03D 15/20 |
| 2021/0095725 A1* | 4/2021 | Rogg | F03D 15/00 |
| 2022/0294312 A1 | 9/2022 | Hernandez Ferre et al. | |

FOREIGN PATENT DOCUMENTS

| | | |
|---|---|---|
| EP | 4057486 A1 | 9/2022 |
| WO | WO2013/109611 A1 | 7/2013 |
| WO | WO2022/134519 A1 | 6/2022 |

OTHER PUBLICATIONS

Friedrich et al., State of the Art and New Technologies of Direct Drive Wind Turbines, XP 2808873A, Towards 100% Renewable Energy, 2017, 33-50.

* cited by examiner

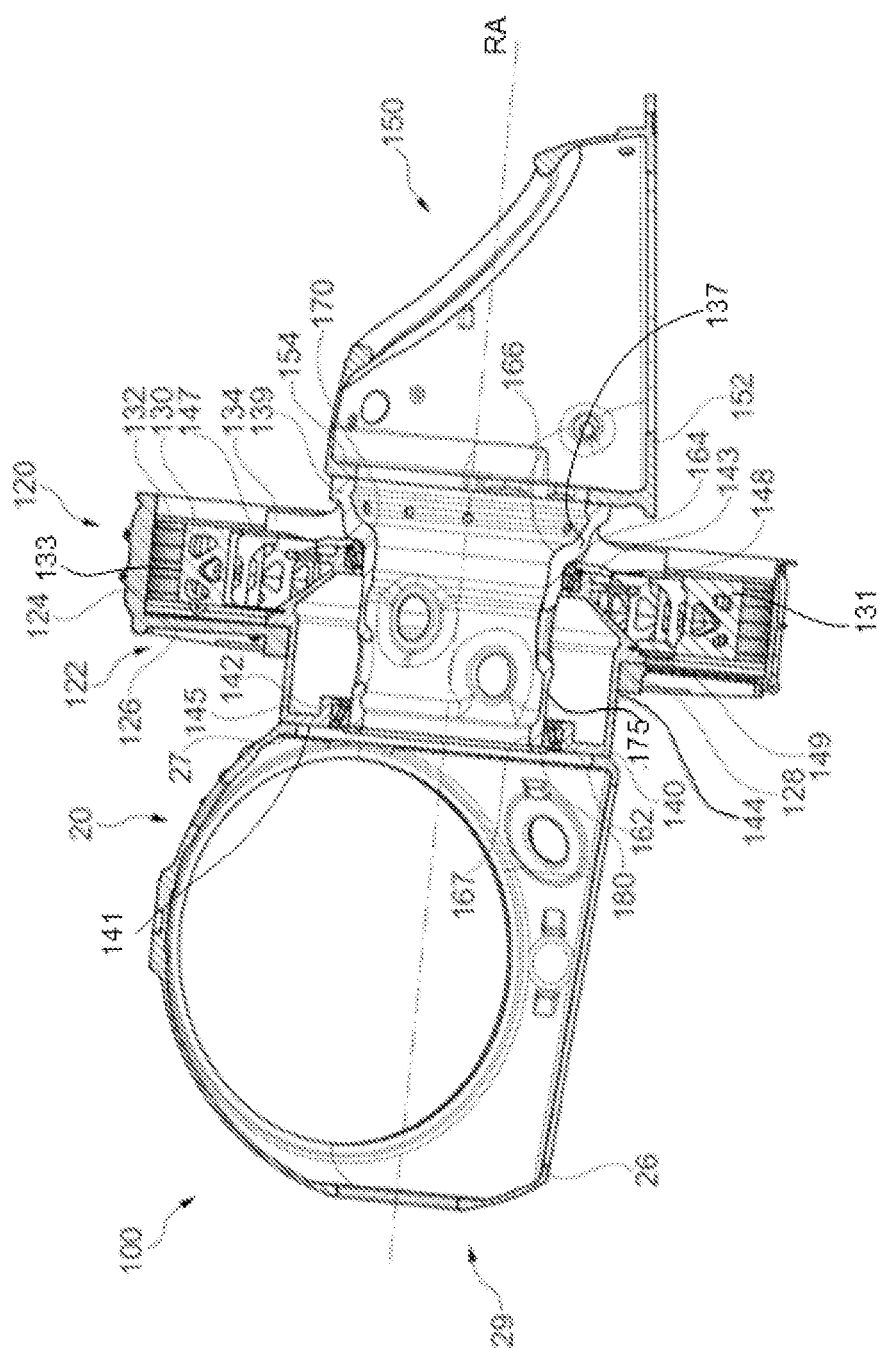

DRIVE TRAIN ASSEMBLIES FOR WIND TURBINES

FIELD

The present disclosure relates to assemblies for wind turbines, and more particularly relates to drive train assemblies for wind turbines. The present disclosure further relates to methods for manufacturing and assembling such drive train assemblies, and to wind turbines comprising such drive train assemblies.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. This rotation generates a torque that is normally transmitted to a generator in order to produce electrical power and feed the electrical power into an electrical grid.

Wind turbines are known in which a rotor shaft connected to the hub acts as a low speed input shaft for the gearbox. The high speed output shaft of the gearbox then drives the generator. It is also known for a rotor hub or rotor shaft connected to the hub to directly drive the generator. Such wind turbines are generally called "direct drive" or "gearless" wind turbines.

The rotational speed of a generator rotor of a direct drive wind turbine corresponds to the rotational speed of the wind turbine rotor (e.g. 2-20 RPM) and is generally much lower than the rotational speed of the generator rotor in cases wherein a gearbox is employed. The diameter of a generator of a direct drive wind turbine is therefore generally much larger. A direct drive wind turbine generator may have e.g. a diameter of 6-8 meters (236-315 inches), a length of e.g. 2-3 meters (79-118 inches).

The generator generally comprises a rotor or rotary structure and a stator or stationary structure. Both the rotor and the stator structure carry electromagnetic elements, and an air gap is provided in between the rotor and stator. For example, permanent magnet excited generators (PMG) are known. In such PMG, permanent magnets are generally mounted on the generator rotor, whereas winding elements (e.g. coils) are usually mounted on the stator. Permanent magnet generators are generally deemed to be reliable and require less maintenance than other generator typologies and are thus specifically suitable for offshore wind turbines.

In the case of a generator with a radial air gap, the rotor may be arranged radially outside the stator, or vice versa. In order for the generator to be efficient from an electromagnetic point of view, the air gap should be as small as possible. On the other hand, the width of the air gap should be sufficient in order to avoid contact between the rotor and stator, which could lead to significant damage in the generator.

The wind turbine rotor is generally provided "upwind" or "upstream" from the tower. In direct drive wind turbines, also the generator may be arranged upwind from the tower. The combined weight of wind turbine rotor (hub and blades), and the generator provides significant bending loads which have to be transmitted to the tower.

Also the aerodynamic loads on the wind turbine rotor have to be transmitted to the tower. Moreover, in operation, sideways and/or fore-aft oscillations may occur. For example, fore-aft oscillations may occur due to aerodynamic thrust on the rotor. In the case of offshore wind turbines, also wave loads can cause significant oscillations.

Oscillations and potential deformations due to (bending) loads can compromise air gap stability. Air gap stability is one of the drivers of the design of the wind turbine configuration, and the configuration of the drive train of the wind turbine. For example, US 2013/0134712 discloses a direct drive wind turbine with active control of the air gap through dampers arranged between the wind turbine rotor and the generator rotor. WO 2012/007185 discloses a wind turbine configuration including two bearings between a rotor hub and a stationary frame, and one or more additional bearings between the generator rotor and the generator stator.

Another important factor to take into account is the weight of the structure on top of the tower. A weight reduction for the structure on top of the tower can lead to further weight reductions in the tower and further support structure (e.g. wind turbine foundation, transition piece etc.).

Other important drivers for the design include manufacturability, the ability to maintain and assemble the drive train assembly, and the cost of energy of the electrical power generated by the wind turbine.

In some known wind turbine configurations, the hub and the generator rotor are connected to a shaft which is rotatably mounted on a stationary frame. One or more bearings may be provided between the shaft and the stationary frame. The stationary frame of the generator is connected to a main frame of the wind turbine. The main frame may be connected to the tower through a yaw system. Such a configuration is known e.g. from the Veasy's 70 wind turbine. The Vensys 70 configuration and other direct drive wind turbine configurations are described e.g. in "*STATE OF THE ART and NEW TECHNOLOGIES OF DIRECT DRIVE WIND TURBINES*", by Friedrich Klinger, published in "Towards 100% Renewable Energy" (Pages 33-50).

Also, the Haliade-X offshore wind turbine has a drive train assembly in which a front bearing is arranged inside the hub of the wind turbine.

The optimization of the design of the wind turbine taking the different requirement and constraints into account is a complicated engineering undertaking. Moreover, the different design variables are interdependent and interact in complex ways. Accordingly, an improved design cannot generally be achieved by focusing on any single aspect but rather should take many or all different aspects into account.

Particularly for large offshore wind turbines, e.g. with a nominal power output or power rating of 12 MW or more, optimization of the wind turbine configuration and drive train structure can be complicated. In addition to the structural requirements, also other factors, such as effective and efficient cooling of the generator have to be taken into account.

SUMMARY

In an aspect of the present disclosure, a drive train assembly for a wind turbine is provided. The assembly comprises a rotor hub and a generator. The generator module comprises a generator stator, and a stationary frame for supporting the generator stator. The generator module further comprises a generator rotor, a shaft for supporting the generator rotor, and a bearing assembly for rotatably mounting the shaft on the stationary frame. The bearing assembly comprises a front bearing and a rear bearing. In the drive train assembly, the shaft is removably connected to the generator rotor and an upwind end of the generator module is attached to a downwind end of the rotor hub.

In accordance with this aspect, a drive train assembly for a wind turbine is provided, which can improve air gap stability as compared to prior art configurations in which the shaft and stationary frame are arranged more forward (more "upwind") with respect to the generator rotor and stator. The arrangement with a rotatably mounted shaft which is removably connected to the generator rotor facilitates manufacturing and assembly and maintenance of the drive train assembly.

The upwind end of the generator rotor may herein be interpreted as follows: when the wind turbine is operating normally, the nacelle and wind turbine rotor will be substantially aligned with a prevailing wind direction. The wind will thus flow from an upwind side of the wind turbine to a downwind side of the wind turbine. The upwind end of the generator rotor may be regarded as the end or end portion of the generator rotor that is located furthest to the upwind side, i.e. furthest in front of the tower. The downwind end of the rotor hub may be regarded as the end or end portion of the rotor hub that is located furthest to the downwind side. Similarly, other wind turbine components that extend in the longitudinal direction may have their own upwind side and upwind end, and their own downwind side and downwind end. The upwind end may also be regarded as the front end of a component, whereas the downwind end of a component may be regarded as the rear end. The terms "upwind" and "upstream" and the terms "downwind" and "downstream" may be used interchangeably.

A drive train assembly may herein be regarded as the assembly of components that convert mechanical power to electrical power. In a direct drive wind turbine, the drive train assembly may generally comprise the wind turbine rotor (rotor hub and blades), the generator and any component in between that transmits mechanical power from the wind turbine rotor to the generator.

In a further aspect, a wind turbine is provided, which comprises the assembly according to any of the examples disclosed herein. The wind turbine further comprises a nacelle, wherein the nacelle is arranged at a downwind side of the generator module.

Additional objects, advantages and features of embodiments of the present disclosure will become apparent to those skilled in the art upon examination of the description, or may be learned by practice.

BRIEF DESCRIPTION OF THE DRAWINGS

FIG. 2A schematically illustrates a cross-section view of an example of a wind turbine assembly;

DETAILED DESCRIPTION OF EXAMPLES

Figure 1:
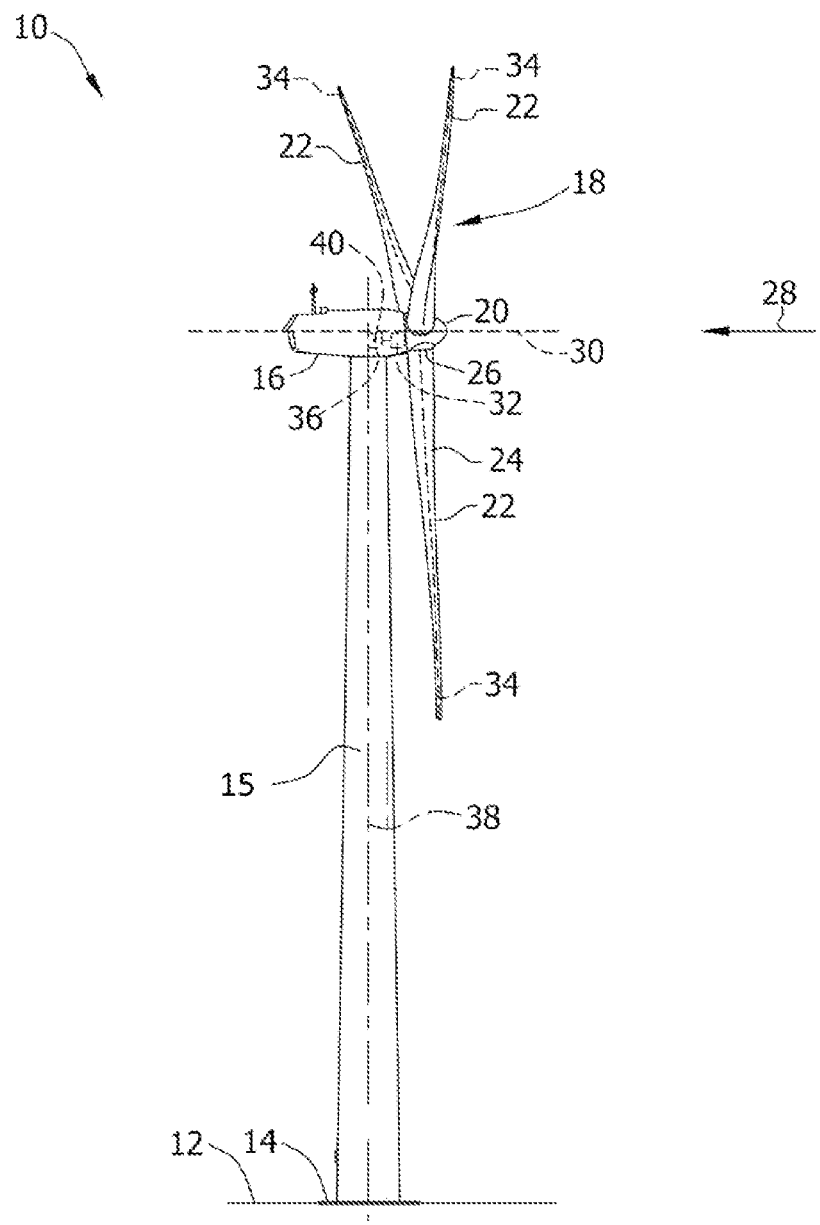
FIG. 1 schematically illustrates a perspective view of one example of a wind turbine.

Reference will now be made in detail to embodiments of the present teaching, one or more examples of which are illustrated in the drawings. Each example is provided by way of explanation only, not as a limitation. It will be apparent to those skilled in the art that various modifications and variations can be made without departing from the scope or spirit of the present teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the effective wind, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2B:
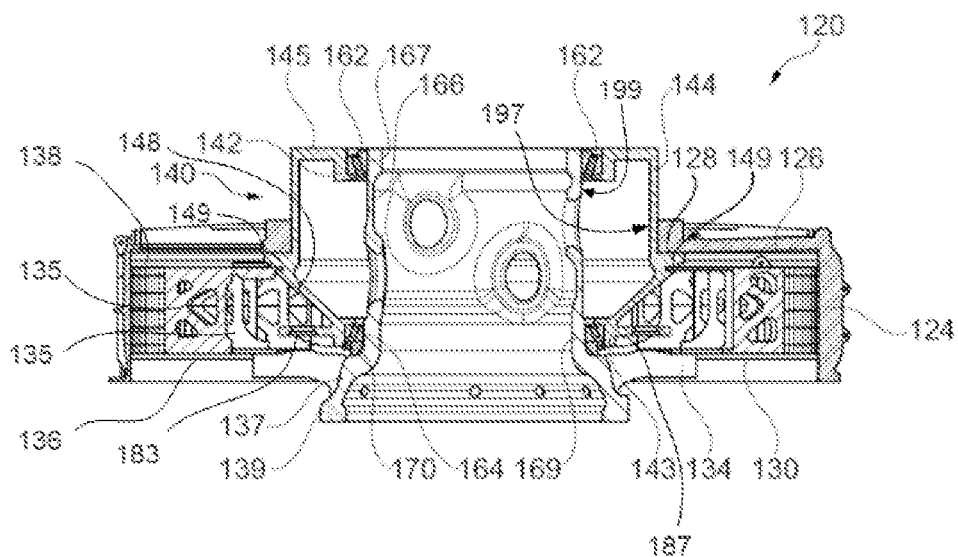
FIGS. 2B-2C schematically illustrates several detail views of the example of the wind turbine assembly of FIG. 2A.
Figure 2C:
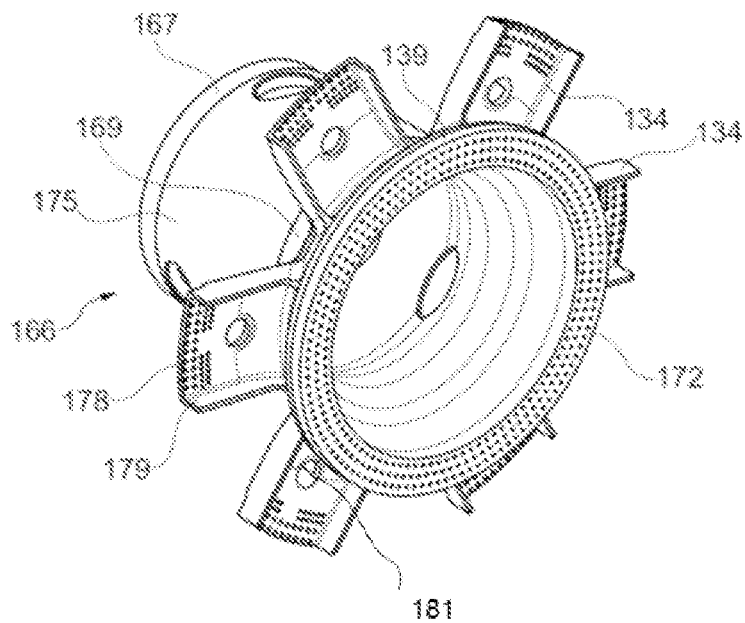

FIG. 2A schematically illustrates a cross-sectional view of an example of a drive train assembly attached to a main frame of a wind turbine. FIG. 2B shows the generator module of this example, and is intended to be illustrative for the method of assembly of the drive train. FIG. 2C shows an isometric view of the stationary frame of the generator module of this examples. The example of FIGS. 2A-2C will now be described in more detail.

FIG. 2A illustrates a drive train assembly 100 for a wind turbine. The drive train assembly 100 comprises a rotor hub 20 and a generator module 120. The generator module 120 comprises a generator stator 130, and a stationary frame 166 for supporting the generator stator 130. The generator module 120 further comprises a generator rotor 122, a shaft 140 for supporting the generator rotor 122, and a bearing assembly for rotatably mounting the shaft 140 on the stationary frame 168. The bearing assembly comprises a front bearing 162 and a rear bearing 164. The upwind end of the generator module is attached to the downwind end of the rotor hub.

The generator module 120 thus includes a rotary structure (generator rotor 122 and shaft 140), and a stationary structure (stationary frame 166 and generator stator 130) and the bearing assembly. The components of the generator module disclosed herein may be pre-assembled and tested independently from other wind turbine components.

In this example, the rotor hub 20 comprises a hub mounting flange 27 defining the downwind end of the rotor hub, and the generator module 120 comprises a generator mounting plane 141 defining the upwind end of the generator module. As may be seen in FIG. 2A, the rotor hub 20 is entirely arranged upwind from the generator module 120. In other words, the generator module 120 is entirely arranged downwind from the rotor hub 20.

The hub 20 may comprise three mounting flanges or load transfer regions 26 to which the blades (not shown in FIG. 2) may be attached. Each of the blades may be connected to the hub 20 via a pitch system as described with reference to FIG. 1.

At the upwind side 29 of the hub, a nose cone or "spinner" may be mounted. At the downwind side of the hub, the hub 20 comprises an annular hub mounting flange 27. In the example of FIG. 2, the shaft 140 includes a shaft mounting flange 145 for attachment to the annular hub mounting flange 27. A front or upwind surface of the generator mounting flange may form a generator mounting plane 141.

Since the generator mounting plane 141 is incorporated in the shaft 140 downwind from the rotor hub, a larger flat surface area that is suitable for connecting the shaft 140 to the hub than in some prior art configurations may be available. Similarly, a larger flat surface area may be available at the downwind end of the rotor hub 20.

The shaft 140 in this example includes a front bearing seat 142 for supporting the front bearing 162. The shaft 140 further includes an annular, radially extending, shaft mounting flange 145. The outer wall of front (or "upwind") surface thereof defines an annular mounting plane 141. Any suitable fasteners may be used to attach the shaft 140 at the mounting plane 141 to the mounting flange 27. In particular, bolts may be used.

The shaft 140 in this example further includes a substantially cylindrical portion 144 which connects the shaft mounting flange 145 to a flange 149 of the shaft for connecting to the generator rotor 122.

An aspect of having the substantially cylindrical portion 144 of shaft 140 attached to the shaft mounting flange 145 is that a significant annular space is created between an inner wall 197 of the shaft 140 and an outer wall 199 of the stationary frame 166. The annular space created may be used for a variety of purposes. In examples, structural reinforcements might be included in this annular space.

The generator rotor 122 is removably connected to the shaft 140. For example, a bolted connection at flange 149 of the shaft and flange 128 of the generator rotor 122.

By making the connection between the generator rotor 122 and the shaft 140 removable, manufacturing can be facilitated. The generator rotor may have an outer diameter of e.g. 6-8 meters. In order to facilitate manufacturing, the generator rotor 122 may be manufactured in segments. For example, two, three or more segments may be used and separately manufactured. Each of the segments may form a ring sector.

The segments may then be assembled to each other to form the generator rotor. Each of the segments may be manufactured by metal casting. For example, ductile iron casting may be used. The shaft may be manufactured separately as an integral piece, also by metal casting. E.g. casted ductile iron or steel casting may be used. By manufacturing the shaft and the generator rotor 122 separately, the manufacturing process can be simplified.

In the illustrated example, the shaft further comprises a tapered or frustoconical portion 148. The frustoconical portion 148 connects the flange 149 of the shaft to the rear bearing seat 143. The rear bearing seat 143 supports the rear bearing 164. The shaft 140 in this example further comprises an annular extension or ring 147, which includes several holes 183. The function of these holes will herein be described with reference to corresponding hole in stationary frame 166. The ring 147 may also include a plurality of weight-saving holes 189.

The generator module 120 includes the generator rotor 122 and the generator stator 130. The generator rotor 122 is removably attached to the shaft 140 as mentioned before. The generator rotor 122 in this example further includes a radially outwardly extending front cover 126. The front cover 126 closes off the generator at a front or upwind side. The front cover 126 further is configured to support the outer rotor rim 124.

The outer rotor rim 124 in this example carries the electromagnetic elements. In the specific example, the generator may be a permanent magnet generator, wherein the generator rotor carries permanent magnets, and the generator stator carries a plurality of coils. The magnets may be arranged in permanent magnet modules. In operation, the rotational movement of the rotor with the permanent magnets will cause a varying magnetic field in the windings which causes electrical currents in the windings.

The generator stator 130 in this example comprises a stator structure 131 which is connected to the stationary frame 166. The stator structure 131 may be substantially U-shaped in radial cross-section. The stator structure 131 may include a stator rim 133 connected at a front (or "upwind") wall 138 and a rear (or "downwind") wall 136. The front and rear walls 136, 138 may be substantially parallel. In a radial cross-section of the stator 130, the stator rim 133 and walls 136, 138 together define the U-shape. The stator structure 131 may further include a plurality of radially arranged inner stator stiffeners 135.

The rear wall 138 may comprise a plurality of radially inwardly extending flanges. The generator stator 130 may be connected to the arms 134 of the stationary frame 166 at these flanges. The stator 130 may thus be supported at the downwind end of the stator only and forms a cantilever structure.

The generator stator 130 further includes a plurality of coils 132 arranged at the stator rim 133, i.e., along the outer circumference of the stator. In between the coils 132 and the permanent magnets, a radial air gap is defined. In the disclosed example, the generator rotor 122 is arranged radially outside the generator stator 130, but in other examples, the generator rotor might be arranged radially inside the stator.

In the illustrate example, the electromagnetic elements (coils and magnets) may be cooled using an axial cooling air flow through the air gap. In particular, in the illustrated example, a plurality of cold air inlets may be arranged at the rear wall 138. The cold air may be distributed along the circumference of the stator 130 through holes provided in the inner stator stiffeners 135. The hole in the inner stator stiffeners 135 may act as cooling air distribution orifices.

The cold air may exit the stator 130 at the front wall 136 and be directed or guided towards the air gap. The cold air may flow from the upwind side axially through the air gap to the downwind side. As the cooling air flows through the air gap, it can cool down the electromagnetic elements. The cooling air in turn heats up. The heated cooling air may exit the generator at the rear wall 138 through a plurality of air outlets.

In some examples, the heated-up cooling air may then be cooled again in a heat exchanger, prior to flowing back towards the inlets at the rear wall 138 of the stator 130. Any suitable heat exchanger may be used, e.g., a liquid-air heat exchanger.

Similarly, as for the generator rotor 122, also the generator stator 130 and in particular the stator structure 131 may be manufactured in separate segments, e.g., two, three or more segments, which are attached to each other to form the stator structure 131 of the generator stator 130.

In the illustrated example (with specific reference to FIG. 2C), the stationary frame 166 of the generator module 120 includes a front bearing seat 167 which supports the front bearing 162, a rear bearing seat 169 for supporting the rear bearing 164, and a substantially cylindrical portion 175 between the front and rear bearing seats.

The stationary frame 166 in this example may further include a plurality of arms 134. The arms 134 extend radially outwardly and connect the stationary frame 166 to the generator stator 130. In this example, the arms 134 extend radially outwardly substantially along a radial plane, i.e. the arms do not extend forwardly or rearwardly in a significant manner.

In order to connect the stationary frame 166 to the generator stator, the arms 134 may include a plurality of fastener holes 178. Suitable fasteners, such as e.g. bolts may be used to connect the stationary frame 166 to the generator stator 130. More particularly, in this example, the stationary frame 166 is connected to the stator structure 131 of the generator stator 130. And in this specific example, six arms 134 are provided, but it will be clear that in other example, any other suitable number of arms 134 may be used.

The arms 134 may be integrally formed with the stationary frame 166, for example, as a single piece casting. In other examples, the arms 134 may be manufactures separately and fixedly or removably attached to the stationary frame. In the illustrated example, the arms 134 are formed with a C-shaped cross-section with sidewalls 179. In other examples, other suitable shapes may be used.

The stationary frame may comprise a plurality of first holes, and the shaft comprises a plurality of (corresponding) second holes. The first and second holes may be configured to receive a locking pin to rotationally lock the shaft to the stationary frame.

The arms 134 may include a plurality of first holes 181 for receiving a locking pin. In order to perform certain maintenance tasks, the wind turbine rotor may need to be securely locked in position. The shaft 140 of the generator module may include a plurality of second holes 183. In this particular example, the shaft 140 includes a ring 187 incorporating the holes 183.

When the wind turbine rotor is to be locked in position, one or more of the second holes 183 may be aligned with corresponding first holes 181 in the stationary frame. A locking pin may be introduced in one of the pairs of corresponding first and second holes 181, 183, so as to lock the generator rotor 122 in place. In examples, multiple locking pins may be used which are introduced into aligned pairs of first and second holes 181, 183. Since the wind turbine rotor is connected to the shaft, the whole drivetrain may be locked, so that maintenance and/or inspection tasks can be carried out safely.

The stationary frame 166 may further include an outwardly tapering portion 137 which ends in mounting flange 139, i.e., a diameter of the stationary frame 166 along this portion increases in the downwind direction. Mounting flange 139 defines a mounting plane 172. The drive train assembly 100 and more particularly, the generator module 120 of the assembly 100 may be attached to a main frame 150 of the wind turbine at the mounting plane 172 defined by flange 139 of the stationary frame 166.

In some examples, the stationary frame 166 may be made of casted ductile iron.

In a further aspect of the present disclosure, a wind turbine is provided, which comprises a drive train assembly according to any of the examples herein disclosed. The wind turbine may be an onshore wind turbine or an offshore wind turbine. In the case of an offshore wind turbine, the offshore wind turbine may be fixed or floating.

The main frame 150 of the wind turbine may be rotatably mounted on the tower (not shown in FIG. 2A). The main frame 150 is configured to support the drive train assembly 100 and transmit all relevant loads to the wind turbine tower.

The main frame 150 may include an annular flange 152 which is supported by a yaw bearing. A suitable yaw system (not illustrated) may be used to rotate the main frame (and the whole uptower structure) with respect to the tower, such that in operation the wind turbine rotor can be aligned with the prevailing wind direction. Also, when needed, the wind turbine rotor may be rotated away from the wind direction e.g., in case of a malfunction.

The wind turbine may further comprise a nacelle (not shown in FIG. 2). The nacelle may be arranged downwind from the generator module 120, i.e. the nacelle does not encompass the generator module. The nacelle may enclose electrical equipment (e.g. a converter, transformer, lighting), mechanical equipment (cranes or hoists, platforms used during installation) and/or other equipment (air conditioning, heat exchanger, communication systems) and may be attached to the central frame of the machine. For example, bolts may be sued to connect the nacelle to the central frame. The nacelle may include a housing which protects the electrical and mechanical equipment inside from the humid and/or corrosive outdoor environment.

In this particular example, a stopper 170 may be arranged at the downwind side of the rear bearing 164. The stopper 170 may have a substantially flat front surface which allows secure positioning of the rear bearing 164 during assembly. The stationary frame 166 may thus be more rounded in this area, and local stress concentrations in the stationary frame 166 may be avoided or at least reduced.

The front bearing 162 and rear bearing 164 enable the shaft 140 to rotate about rotational axis RA and transmit loads from the wind turbine rotor to the stationary frame 166. Loads that are to be transmitted through the bearings 162, 164 include e.g., axial loads (e.g., aerodynamic thrust on the wind turbine rotor) and radial loads (e.g., due to electromagnetic forces in the generator or loads due to the weight of the wind turbine rotor positioned upwind from the bearings). The shaft 140 is arranged radially surrounding the stationary frame, and the bearings 162, 164 are arranged radially in between the stationary frame and the shaft 140.

Increasing the (longitudinal) distance between the front and rear bearings 162, 164 improves the ability of the bearings to absorb and transmit the bending loads. In other words, the mechanical requirements for the bearings may be reduced if they are placed further apart. In examples, a distance between the front bearing and the rear bearing may be 1.5 meters or more, and specifically 2 meters or more. The longitudinal distance between the bearings may be measured along the longitudinal direction, i.e., along or parallel to the axis of rotation RA.

By arranging both the front bearing 162 and the rear bearing 164 downwind from the hub, they are positioned closer to the generator rotor and stator. The air gap stability between the electromagnetic elements of the generator rotor 122 and stator 130 may thus be improved. Oscillations and other movements that may occur in the wind turbine rotor will have less of an effect on the air gap. Improved air gap stability may lead to a more compact design of the generator, which may reduce the overall weight of the drive train. Reduction of weight of the generator may lead to further weight reductions in the tower, and tower support structure.

In some examples, a nominal value of a radial air gap between the generator rotor 122 and generator stator 130 is in a range of 5-10 mm, specifically between 6 and 8 mm. A nominal value of the air gap may herein be regarded as the average width of the air gap according to the design of the generator, i.e. in absence of deformations or oscillations caused by e.g. the aerodynamic or electromagnetic loads. By positioning the bearings closer to the generator rotor and stator, an air gap of 5-10 mm even for wind turbines with a nominal power rating of 12 MW or more may be achieved. During normal operation of the wind turbine (i.e., operation without failures), the arrangement of the bearings and overall stiffness of the structure ensure that loads, and oscillations are effectively transmitted to the tower, and the air gap maintains at least 50% of its nominal value in all operating conditions and along the entire circumference of the generator.

In some examples, the front and rear bearings 162, 164 may be single row tapered roller bearings. Two single row tapered roller bearings can support and transmit all relevant forces and moments.

The combination of two single row tapered roller bearings may have a reduced weight and improved axial and radial guidance as compared to the use of e.g. double tapered roller bearings. In the shown example, the front and rear bearings 162, 164 may be positioned more downwind (more to the rear) than in some prior art configurations, which increases the bending loads that the bearings 162, 164 need to be able to withstand. By choosing single row tapered roller bearings, the weight increase due to the more rearward positioning may at least be partially compensated.

Each of the bearings 162, 164 includes an inner ring (or inner "raceway"), an outer ring (or outer "raceway") and one or more rolling elements in between the inner ring and the outer ring. In the case of single row tapered roller bearing, a single row of rollers (e.g. substantially cylindrical rollers) may be used. The inner and outer rings of the bearings 162, 164 are made of a high-grade steel and because of their function have very high requirements in terms of strength, stiffness and machining tolerances. In particular the steel used for the inner and outer rings of the bearing is of a higher grade steel than the iron or steel used for casting the stationary frame 166 and/or the shaft 140.

An example of an assembly process for the drive train assembly 100 may be illustrated with reference to FIG. 2B. The stationary frame 166 may be provided on a flat (ground) surface. Stopper 170 may be arranged around the stationary frame 166. For example, the stopper 170 may be lifted above the stationary frame 166 and then lowered until the stopper rests against outward tapering portion 137 of the stationary frame 166.

Subsequently, the inner ring of the rear bearing 164 may be lowered in a similar manner until it rests against stopper 170. The inner ring of the rear bearing may be interference fit with the stationary shaft. The inner ring of the rear bearing is pushed to its location and a joint is formed based on friction between the inner ring of the rear bearing 162 and the stationary frame which allows transfer of loads. In examples, a shrink fit may be used. In this case, the inner ring of the rear bearing 162 may be heated up before mounting around the stationary frame. The inner ring of the rear bearing 162 may include the rollers. Because of the heat, the bearing ring expands and thus can be fit around the stationary frame. When the bearing ring cools down, a tight fit is formed between the stationary frame and the bearing. In either case, the bearing (ring) is removably fitted to the stationary frame. After mounting, the bearing ring can be removed when needed. E.g. if a deviation is found during assembly, the bearing (ring) may be removed so that its position may be corrected. Also, the bearing (ring) could be removed in case of damage or premature wear.

In other examples, the bearings may be otherwise removably attached to the stationary frame 166. For example, a bolted connection might be used.

In a next step, the shaft 140 carrying the outer rings of the front and rear bearings 162, 164 may be mounted around the stationary frame 166. Before this, the shaft 140 is fitted with the outer rings of the bearings. In some examples, the outer rings may be mounted using an interference fit.

In examples, the outer bearing rings may be shrink fit. The area of the bearing seats of the shaft 140 may be heated so that they expand, and the outer rings of the bearing may then be fitted. When the shaft 140 cools down, a joint based on friction is formed between the outer bearing ring and the shaft 140 which allows the transfer of loads through the interface. The assembly of the bearing rings with the shaft 140 may be carried out before, or after, or at the same time as the mounting of the inner bearing ring on the stationary frame.

Once the shaft 140 has been fitted with the outer bearing rings, and the stationary frame has been fitted with the inner ring (with rollers) of the rear bearing, the shaft assembly may be elevated and fitted over the stationary frame. The shaft is guided or pushed downwards until the outer ring of the rear bearing 164 engages with the rollers and inner ring of the rear bearing to form the rear bearing 164.

The inner ring of the front bearing 162 may be assembled in a next step. The inner ring may carry the rollers of the bearing. An interference fit or other methods for joining may be used. In a specific example, the inner ring is heated such that it expands and is then fitted around the stationary frame. When the inner ring cools down a joint based on friction is formed between the stationary frame and the front bearing 162.

In examples, after fixation of the inner ring, a pre-load may be applied to the system to compensate for any gaps and to ensure proper operation of the bearing assembly. In the illustrated example, a clamping ring 180 is used for pre-loading the bearing assembly. The looseness or clearance may be measured and based on this measurement, a number of shims with appropriate thickness may be selected. The shims may be arranged between the clamping ring 180 and the inner bearing ring of the front bearing 162, or between the clamping ring 180 and a front surface of the stationary frame 166. The clamping ring may then be bolted to the stationary frame. By tightening the bolts, an axial force is exerted on the clamping ring, the clamping ring may be displaced axially and the inner ring of the front bearing 162 is pushed towards the rear bearing 164. The rear bearing cannot move axially since the inner ring it is retained in its place by stopper 170 and stationary frame 166. The bearing assembly may thus be compressed with a suitable preloading.

After assembly of the shaft 140 with stationary frame 166, the generator rotor and stator may be assembled. In examples, the generator stator 130 including coils and electrical cabling may be mounted next. Subsequently, the generator rotor 122 may be mounted. In examples, the generator rotor 122 without the permanent magnets may be mounted. Assembly of the generator rotor 122 with generator stator 130 may be facilitated if the magnets are not mounted on the generator rotor 122. After the rotor structure has been assembled with the stator 130, the permanent magnets may be mounted. Permanent magnet modules may be used. In examples, the permanent magnet modules may be slid in an axial direction and fixed to a rim of the rotor.

Once the magnets have been mounted on the rotor, the generator module has been fully assembled, and the generator module may be tested. Such testing can be carried out without any connection to any other component.

After full assembly of the generator module 120, the rotor hub 20 may be attached to the generator module 120. The joint of the rotor hub 20 with the generator module may be carried out vertically, i.e. the stationary frame may still be oriented vertically as shown in FIG. 2B. After mounting of the shaft 140, the generator stator 130 and the generator rotor 122, then the hub may be lifted and lowered onto the generator module. In this example, the shaft 140 may be attached to the hub 20.

After the drive train assembly 100 has been assembled, the drive train assembly may be lifted and rotated and mounted on the main frame 150. In examples, the hoisting equipment for lifting the drive train assembly 100 may grip the hub 20, which may be stiffer and stronger than e.g. the parts of the generator. In other examples, the generator module 120 may be attached to the main frame 150 first, and subsequently, the rotor hub 20 may be mounted at the upwind side of the generator module 120.

Figure 3:
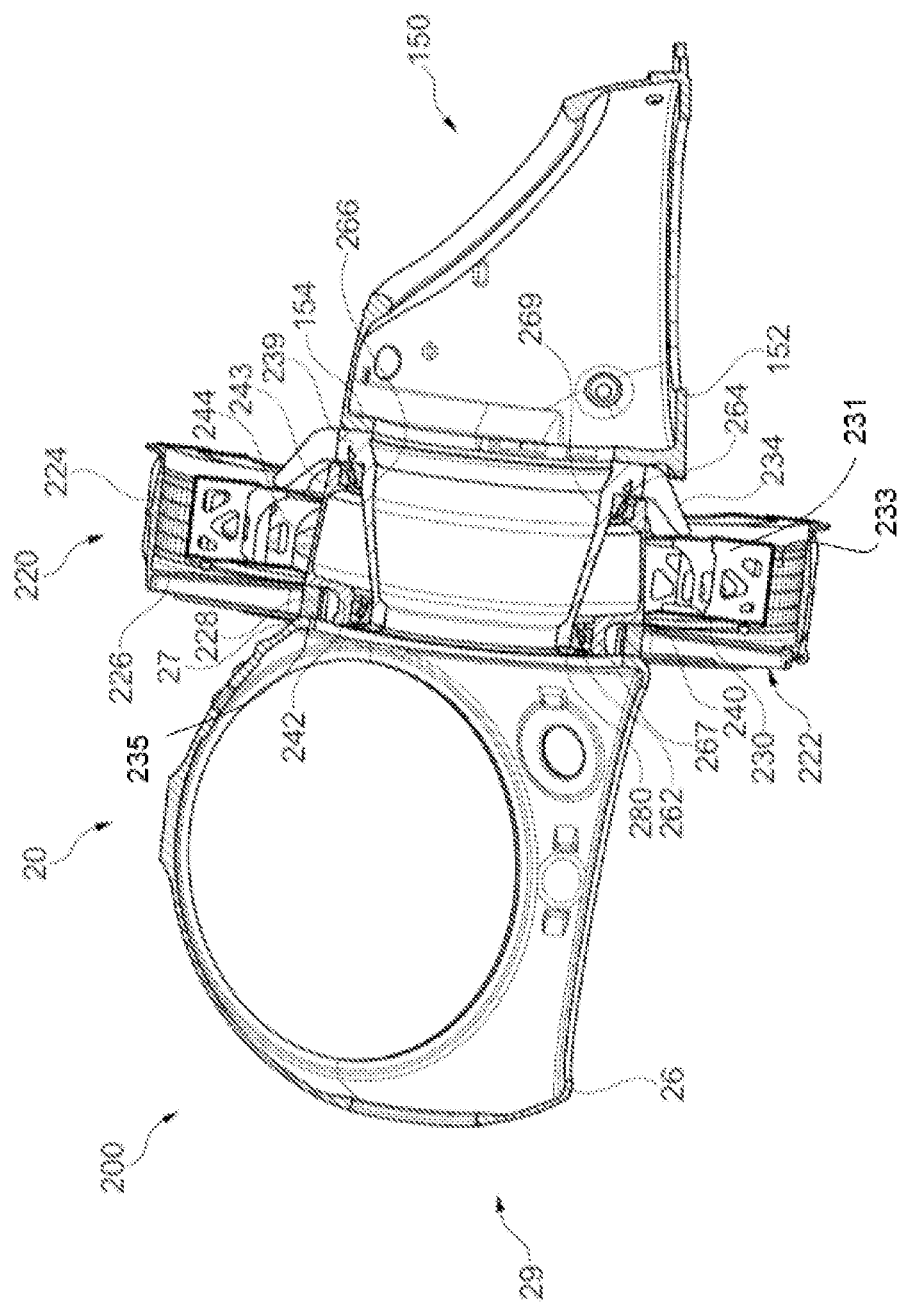
FIG. 3 schematically illustrates another example of a wind turbine assembly.

FIG. 3 schematically illustrates another example of a drive train assembly 200 for a wind turbine. The drive train assembly 200 may be attached to a main frame 150 of a wind turbine. As for the example of FIG. 2, the main frame 150 may be attached at annular flange 152 to a yaw system. The main frame 150 may thus be rotatably mounted on a wind turbine tower and may be rotated orient the main frame 150 (and the entire uptower structure) in or out of the wind direction as desired.

In general, the drive train assembly 200 according to the example of FIG. 3 has many elements in common with the drive train assembly 100. The whole description of the drive train assembly will therefore not be repeated for the example of FIG. 3. Rather, in the following, some aspects of the example of FIG. 3 that are different from the example of FIG. 2 will be highlighted.

The drive train assembly 200 comprises a hub 20 and a generator module 220. The generator module 220 comprises a generator rotor 222 and a generator stator 230. The generator module 220 further comprises a stationary frame 266 which supports the generator stator 230. And the generator rotor 222 is removably attached to shaft 240. The shaft 240 is rotatably mounted on the stationary frame 266.

As in the previous example, the bearing assembly comprises a front bearing 262 and a rear bearing 264, and an upwind end of the generator module is attached to a downwind end of the rotor hub. The rotor hub may comprise a hub mounting flange 27 defining the downwind end of the rotor hub, and the generator 220 comprises a generator mounting plane 235 defining the upwind end of the generator module. In this example, the generator rotor 222 includes the generator mounting plane 235 which is defined by an upwind (front) end of the generator rotor mounting flange 228.

The generator rotor mounting flange 228 may be connected to the hub mounting flange 227 and to the shaft 240. A plurality of fasteners may be arranged to extend through the hub mounting flange 27, the generator rotor mounting flange 228 and a portion of the shaft 240. The fasteners may be arranged in corresponding through holes of the hub mounting flange 27, the generator rotor mounting flange 228 and the shaft 240. Suitable bolts may be used.

In other examples, a first set of fasteners may be used to connect the hub 20 to the generator rotor 222. These first set of fasteners may be arranged in through-holes of the hub 20, and blind holes in the generator rotor mounting flange 228. Suitable studs may be used. A second set of fasteners (e.g., studs) may be used to connect the shaft to the generator rotor mounting flange 228. The shaft may comprise through-holes and the generator mounting flange may comprise corresponding blind holes. An aspect of this example is that the hub 20 may be disassembled from the remainder of the drive train assembly, while leaving the generator rotor 222 and the shaft 240 connected.

In this example, the stationary frame 266 may be substantially frustoconical. The stationary frame may be frustoconical along a portion of its length, or along substantially its entire length (as in the illustrated example). At an upwind end of the stationary frame 266, a front bearing seat 267 is arranged to support the front bearing 262, and a rear bearing seat 269 to support a rear bearing 264 may be arranged near a downwind end of the stationary frame 266.

The stationary frame 266 may comprise a mounting flange 239 to connect to mounting flange 154 of main frame 150.

The shaft 240 may comprise a front flange which forms a front bearing seat 242, and a radially outwardly extending annular portion to which the generator may be mounted. The shaft 240 may further comprise a central portion 244 which is slightly tapered: a diameter of the shaft slightly decreases in a downwind direction. The central portion 244 ends at rear bearing seat 243 supporting the rear bearing 264.

The rear bearing 264 may be arranged axially at a downwind side of the generator stator 230. Thus, in this example, the rear bearing 264 is arranged at a downwind side of the generator stator 230, and the front bearing 262 is arranged at an upwind side of the generator stator 230. Air gap stability may be improved.

As in the previous example, the longitudinal distance between the front bearing 262 and rear bearing 264 may be more than 2 meters.

In this example, the stationary frame 266 comprises a plurality of arms 234 connecting the stationary frame 266 with the generator stator 230, and the plurality of arms 234 extend radially outwardly and axially forwardly from the stationary frame 266. As in the previous example, the arms 234 may be connected to the stator structure 231 of the generator stator 230. The stationary frame may comprise e.g., 6 or 8, or any other suitable number of arms 234. The arms 234 may be integrally formed with the stationary frame, or may be separately manufactured and fixedly or removably attached to stationary frame 266.

As in the previous example, the wind turbine may comprise a nacelle (not shown) which is arranged downwind from the generator module 220.

Even though this is not illustrated in either of the examples, the wind turbine may include a protective shield or cover configured to protect the outer wall of the hub from e.g., UV light, hail or direct rain impact. Such a protective shield or cover may be arranged around at least a portion of the hub or the complete hub and with a separation between the shield and the hub.

This written description uses examples to disclose the teaching, including the preferred embodiments, and also to enable any person skilled in the art to practice the herein disclosed teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A drive train assembly for a wind turbine comprising:
   a rotor hub;
   a generator module, wherein the generator module comprises:
   a generator stator;
   a stationary frame supporting the generator stator;
   a generator rotor;
   a shaft supporting and removably connected to the generator rotor, wherein the rotor hub comprises a hub mounting flange defining the downwind end of the rotor hub, and the shaft comprises a shaft mounting flange defining the upwind end of the generator module;
   a bearing assembly rotatably mounting the shaft on the stationary frame, the bearing assembly comprising a front bearing and a rear bearing, wherein an upwind end of the shaft mounting flange comprises an annular mounting plane for connecting to the hub mounting flange and a bearing seat for the front bearing; and
   an upwind end of the generator module attached to a downwind end of the rotor hub.

2. The drive train assembly of claim 1, wherein the shaft is arranged radially outside of the stationary frame.

3. The drive train assembly of claim 2, wherein an inner ring of the front bearing and an inner ring of the rear bearing are interference fitted to the stationary frame.

4. The drive train assembly of claim 2, wherein an outer ring of the front bearing and an outer ring of the rear bearing are shrink fitted to the shaft.

5. The drive train assembly of claim 1, wherein the front bearing and the rear bearing comprise single row tapered roller bearings.

6. The drive train assembly of claim 1, further comprising a clamping ring attached at an upwind side of the stationary frame and to provide a pre-loading to the bearing assembly.

7. The drive train assembly of claim 1, wherein a longitudinal distance between the front bearing and the rear bearing is at least 1.5 meters.

8. The drive train assembly of claim 1, wherein the shaft comprises a cylindrical portion connecting the shaft mounting flange to a flange that connects the shaft to the generator rotor.

9. The drive train assembly of claim 1, further comprising a stopper arranged at a downwind side of the rear bearing.

10. The drive train assembly of claim 1, comprising a plurality of arms connecting the stationary frame with the generator stator, the plurality of arms extending radially outwardly from the stationary frame within a radial plane.

11. The drive train assembly of claim 1, wherein the rotor hub comprises a hub mounting flange defining the downwind end of the rotor hub, and the generator rotor comprises a generator rotor mounting flange defining the upwind end of the generator module.

12. The drive train assembly of claim 11, wherein the generator rotor mounting flange is connected to the hub mounting flange and to the shaft.

13. The drive train assembly of claim 12, wherein a plurality of fasteners extend through the generator rotor mounting flange, the hub mounting flange and the shaft.

14. The drive train assembly of claim 11, wherein the stationary frame is substantially frustoconical.

15. The drive train assembly of claim 11, wherein the rear bearing is arranged axially at a downwind side of the generator stator.

16. The drive train assembly of claim 15, comprising a plurality of arms connecting the stationary frame with the generator stator, the plurality of arms extending radially outwardly and axially forwardly from the stationary frame.

17. The drive train assembly of claim 1, wherein the generator rotor is arranged radially outside the generator stator.

18. The drive train assembly of claim 1, wherein a radial air gap is defined between the generator rotor and the generator stator.

19. The drive train assembly of claim 18, wherein the radial air gap is between 5 mm-10 mm.

20. The drive train assembly of claim 18, wherein a cooling air flow is directed axially through the radial air gap.

21. The drive train assembly of claim 1, wherein the stationary frame comprises a plurality of first holes, and the shaft comprises a plurality of second holes, and wherein the first and second holes are configured to receive a locking pin to rotationally lock the shaft to the stationary frame.

22. The drive train assembly of claim 1, wherein the generator stator comprises a front wall, a rear wall parallel to the front wall, and a stator rim connecting the front wall to the rear wall.

23. A wind turbine comprising:
a tower;
a main frame rotatably mounted on the tower; and
the drive train assembly according to claim 1, wherein the drive train assembly is attached to the main frame.

24. The wind turbine of claim 23, further comprising a nacelle at a downwind side of the generator module.

25. The wind turbine of claim 23, further comprising a protective cover configured to protect an outer wall of the hub.

26. The wind turbine of claim 23, wherein the wind turbine is an offshore direct-drive wind turbine.

27. The wind turbine of claim 26, wherein the wind turbine has a nominal power output of 12 MW or more.

* * * * *